(12) United States Patent
Zhong

(10) Patent No.: US 8,469,076 B1
(45) Date of Patent: Jun. 25, 2013

(54) POLARIZER FILM PEELING MACHINE AND POLARIZER FILM PEELING METHOD THEREOF

(75) Inventor: Xinhui Zhong, Shenzhen (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 0 days.

(21) Appl. No.: 13/516,719

(22) PCT Filed: May 10, 2012

(86) PCT No.: PCT/CN2012/075278
§ 371 (c)(1),
(2), (4) Date: Jun. 15, 2012

(51) Int. Cl.
*B32B 38/10* (2006.01)

(52) U.S. Cl.
USPC .......... 156/764; 156/714; 156/715; 156/759; 156/766; 156/924; 156/937

(58) Field of Classification Search
None
See application file for complete search history.

(56) References Cited

U.S. PATENT DOCUMENTS

| | | | | |
|---|---|---|---|---|
| 4,752,346 A | * | 6/1988 | Platzer | 156/712 |
| 5,252,169 A | * | 10/1993 | Bechmann | 156/761 |
| 5,478,434 A | * | 12/1995 | Kerr et al. | 156/760 |
| 5,540,809 A | * | 7/1996 | Ida et al. | 156/760 |
| 6,500,298 B1 | * | 12/2002 | Wright et al. | 156/708 |
| 6,802,926 B2 | * | 10/2004 | Mizutani et al. | 156/247 |
| 7,763,141 B2 | * | 7/2010 | Yamamoto | 156/285 |
| 8,137,502 B2 | * | 3/2012 | Su | 156/702 |
| 8,142,610 B2 | * | 3/2012 | Tani et al. | 156/715 |
| 2003/0029562 A1 | * | 2/2003 | Yotsumoto et al. | 156/344 |
| 2009/0097892 A1 | * | 4/2009 | Murakami et al. | 399/349 |
| 2010/0181019 A1 | * | 7/2010 | Kino et al. | 156/247 |

* cited by examiner

*Primary Examiner* — Mark A Osele
*Assistant Examiner* — Nickolas Harm
(74) *Attorney, Agent, or Firm* — Cheng-Ju Chiang

(57) ABSTRACT

The present invention relates to a polarizer film peeling machine and a polarizer film peeling method thereof. The polarizer film peeling machine includes an operation platform and a conveyor device having a translatable surface. The operation platform forms a slit at a site where a polarizer film is peeled off. The translatable surface of the conveyor device is located under the slit. In peeling off a polarizer film, a glass substrate from which the polarizer film is to be removed is set to slide on the a top surface of the operation platform to pass through the slit and the peeled-off polarizer film is guided through the slit to be laid flat on the translatable surface of the conveyor device and move with the translatable surface of the conveyor device.

12 Claims, 3 Drawing Sheets

POLARIZER FILM PEELING MACHINE AND POLARIZER FILM PEELING METHOD THEREOF

BACKGROUND OF THE INVENTION

1. Field of the Invention

The present invention relates to techniques of peeling off polarizer film, and in particular to a polarizer film peeling machine and a polarizer film peeling method thereof.

2. The Related Arts

In a manufacture process of TFT-LCD (Thin-Film Transistor Liquid Crystal Display), the result of attaching a polarizer film is of vital importance. Being attached in an insufficiently precise manner, forming air bubbles, and scratching of the polarizer film are common factors for removing the already-attached polarizer film and re-attaching a new polarizer film for the purposes of meeting the desired quality.

The known method for removing a polarizer film is to first wedge a cutting blade into the joint seam between a polarizer film and a glass substrate to lift up a leading tip of the polarizer film and the then the lifted leading tip of the polarizer film is forcibly pulled until the polarizer film is completely separated from the glass substrate. Referring to FIG. 1, a cross-sectional view showing the structure of a conventional polarizer film peeling machine is given. The known polarizer film peeling machine adopts a single-roller system, which comprises an operation platform 101 and a rotary roller 102. The operation platform 101 forms a slit 103, which is the site where the polarizer film is peeled off. The rotary roller 102 is arranged under the slit 103. When a glass substrate 104 from which a polarizer film is to be removed slides on the operation platform 101 to pass through the slit 103, a lifted leading tip of the polarizer film 105 is coupled to the rotary roller 102, whereby with the sliding movement of the glass substrate 104 on the operation platform 101 and rotation of the rotary roller 102 in the direction of arrow B, the polarizer film 105 is gradually peeled off the glass substrate 104 and wound around the rotary roller 102. Using the known polarizer film peeling machine requires to rotate the rotary roller 102 in the opposite direction indicated by arrow A after the polarizer film 105 is peeled off the glass substrate in order to remove the polarizer film 105 wound around the rotary roller 102, and then a subsequent cycle of peeling operation of polarizer film may be conducted. Such a process of operation does not allow continuously peeling off polarizer films, making the operation efficiency low.

Further, during the process of removing polarizer film, the glass substrate 105 must slide on the operation platform 101 and a great friction is induced with respect to the operation platform 101, leading to accumulation of a large amount of static electricity. This can be a tremendous risk to the circuit formed on the polarizer film 105, as well as physical safety of operators.

SUMMARY OF THE INVENTION

Thus, an object of the present invention is to provide a polarizer film peeling machine that allows of continuous peeling of polarizer films.

Another object of the present invention is to provide a polarizer film peeling method carried out by a polarizer film peeling machine that allows of conduction of continuous polarizer film peeling operations.

To achieve the objects, the present invention provides a polarizer film peeling machine, which comprises an operation platform and a conveyor device having a translatable surface. The operation platform forms a slit at a site where a polarizer film is peeled off. The translatable surface of the conveyor device is located under the slit. In peeling off a polarizer film, a glass substrate from which the polarizer film is to be removed is set to slide on the a top surface of the operation platform to pass through the slit and the peeled-off polarizer film is guided through the slit to be laid flat on the translatable surface of the conveyor device and move with the translatable surface of the conveyor device.

Wherein, the conveyor device comprises an elongate conveyance belt or an elongate conveyor chain.

Wherein, a leading tip of the peeled-off polarizer film is coupled to an upper surface of the elongate conveyance belt or elongate conveyor chain.

Wherein, a leading tip of the peeled-off polarizer film is coupled to a lower surface of the elongate conveyance belt or elongate conveyor chain.

Wherein, the polarizer film peeling machine further comprises a rotary roller, which is arranged under the slit, whereby the peeled-off polarizer film that moves downward through the slit is changed of direction by the rotary roller to be laid flat on the translatable surface of the conveyor device and move with the translatable surface of the conveyor device.

Wherein, the closest gap between the rotary roller and the translatable surface of the conveyor device is arranged to allow the rotary roller to press the peeled-off polarizer film down toward the translatable surface of the conveyor device and allowing the peeled-off polarizer film to pass through the gap.

Wherein, the rotary roller is set to actively rotate.

Wherein, the rotary roller is set to be passively rotated.

Wherein, the operation platform is made of an electrically conductive material and is grounded, Wherein, the operation platform forms, in a location close to the slit, a recessed ventilation channel that is substantially parallel to the slit, and the ventilation channel comprises air passages that are in communication with the ventilation channel.

The present invention also provides a polarizer film peeling method carried out by a polarizer film peeling machine, comprising the following steps:

(1) moving a glass substrate from which a polarizer film is to be peeled off along a top surface of an operation platform to pass through a slit formed in the operation platform at a site where the polarizer film is peeled off; and (2) guiding the peeled-off polarizer film downward through the slit to be laid flat on a translatable surface of a conveyor device so as to move with the translatable surface of the conveyor device.

Wherein, the conveyor device is an elongate conveyance belt or an elongate conveyance chain; the operation platform is made of an electrically conductive material and is grounded; the operation platform forms, in a location close to the slit, a recessed ventilation channel that is substantially parallel to the slit, the ventilation channel comprising air passages that are in communication with the ventilation channel, whereby high temperature air is supplied through the air passages to heat the polarizer film during an operation of peeling off polarizer film.

The present invention provides a polarizer film peeling machine and a polarizer film peeling method thereof that allow operations of peeling off polarizer films to be carried out in a continuous process, eliminate the potential risks to panels and operators caused by accumulation of static electricity during the process of peeling off polarizer films, is capable of heating polarizer films to weaken peeling strength and reduce the chance of breaking substrates.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, will be apparent from the following detailed description of embodiments of the present invention, with reference to the attached drawings. In the drawings.

DETAILED DESCRIPTION OF THE PREFERRED EMBODIMENTS

Figure 1:
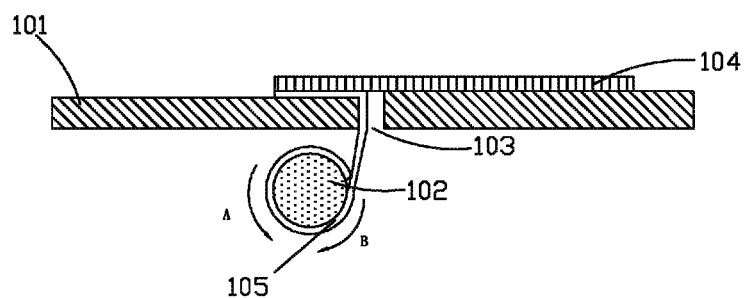
FIG. 1 is a cross-sectional view showing the structure of a conventional polarizer film peeling machine.
Figure 2:
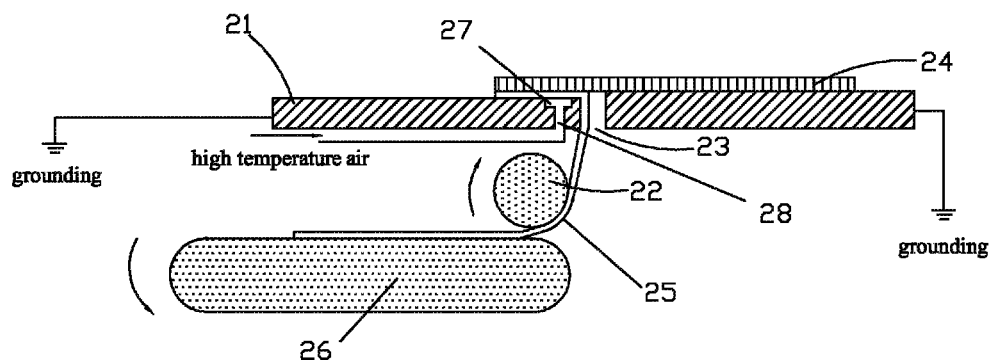
FIG. 2 is a longitudinal sectional view of a polarizer film peeling machine according to a preferred embodiment of the present invention.
Figure 3:
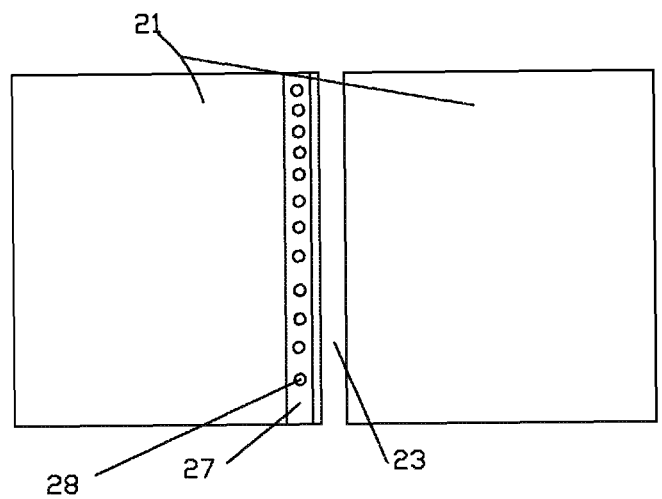
FIG. 3 is a top plan view of FIG. 2.

Referring to FIGS. 2 and 3, FIG. 2 is a longitudinal sectional view of a polarizer film peeling machine according to a preferred embodiment of the present invention and FIG. 3 is a top plan view of FIG. 2. The polarizer film peeling machine according to the preferred embodiment comprises an operation platform 21 and an elongate conveyance belt 26 of conveyor having a translatable surface. The operation platform 21 forms a slit 23, which is the site where a polarizer film is peeled off. The translatable surface of the elongate conveyance belt 26 is located under the slit 23. In peeling off a polarizer film 25, a glass substrate 24 from which a polarizer film is to be removed is set to slide on the a top surface of the operation platform 21 to pass through the slit 23, whereby a peeled-off polarizer film 25 is guided through the slit 23 to be laid flat on the translatable surface of the elongate conveyance belt 26 and move with the translatable surface of the elongate conveyance belt 26. Alternatively, the elongate conveyance belt 26 can be replaced by an elongate conveyor chain or other conveyance device, such as slide blocks movable along a rail. The peeled polarizer film 25 has a leading tip that can be coupled to an upper surface of the elongate conveyance belt 26, whereby with the active rotation of the elongate conveyance belt 26, the polarizer film 25 is caused to move horizontally. Replacing a rotary cylindrical roller that is adopted in the known techniques for peeling off a polarizer film with an arrangement of elongate conveyor belt allows of continuous operation of peeling polarizer films.

The polarizer film peeling machine according to the preferred embodiment further comprises a rotary roller 22. The rotary roller 22 is arranged under the slit 23. The peeled-off polarizer film 25 that moves downward through the slit 23 is changed of direction by the rotary roller 22 to be laid flat on and move with the upper surface of the elongate conveyance belt 26. The rotary roller 22 and the elongate conveyance belt 26 are rotated in the directions indicated by arrows of the drawing so that the rotary roller 22, which can either actively rotate or is passively driven, provides a function of guidance, and in the instant embodiment, the elongate conveyance belt 26 is set to actively rotate.

Further, in an alternative embodiment, the closest gap between the rotary roller and the translatable surface of the conveyor device is arranged to allow the rotary roller to press the peeled-off polarizer film down toward the translatable surface of the conveyor device but allowing the peeled-off polarizer film to pass through the gap. In other words, the leading tip of the polarizer film is not necessarily coupled to the translatable surface of the conveyor device and friction is used to make the peeled-off polarizer film to move with the motions of the rotary roller and the translatable surface of the conveyor device. Under this condition, at least one of the rotary roller and the conveyor device is set to actively operate and the rotary roller can be set to actively rotate or can be passively rotated.

Further, in the preferred embodiment, the operation platform 21 is made of an electrically conductive material and is grounded in order to eliminate the potential risks to the panels and operators caused by accumulation of static electricity during the process of peeling off polarizer films. The operation platform 21 forms, in a location close to the slit 23, a recessed ventilation channel 27 that is substantially parallel to the slit 23. The ventilation channel 27 comprises air passages 28 that are in communication with the ventilation channel 27, whereby high temperature air can be supplied to heat the polarizer film 25 during the operation of peeling off polarizer film in order to weaken the peeling strength and thus reduce the chance of breaking substrate.

The location where the conveyor device that has a translatable surface can be installed in the polarizer film peeling machine of the present invention can be of various forms.

Figure 4:
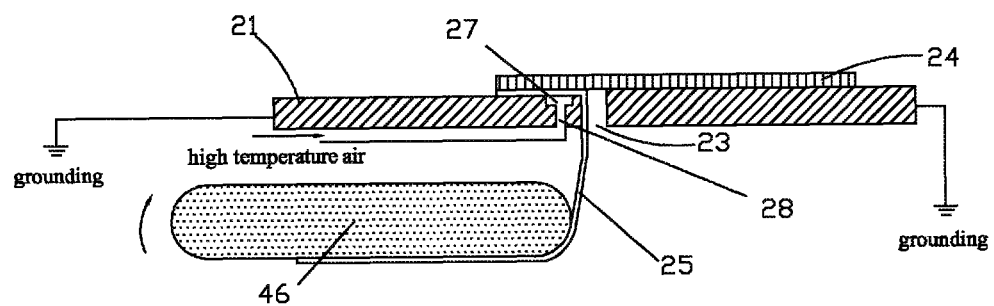
FIG. 4 is a longitudinal sectional view of a polarizer film peeling machine according to another preferred embodiment of the present invention.

Referring to FIG. 4, a longitudinal sectional view of a polarizer film peeling machine according to another preferred embodiment of the present invention is shown. In this preferred embodiment, identical references are used for similar or identical parts shown in FIG. 2 and the structure thereof may be referred to the description of FIG. 2. In the instant embodiment, the rotary roller 22 of FIG. 2 is omitted and the leading tip of the peeled-off polarizer film 25 is coupled to a lower surface of the elongate conveyance belt 46, whereby with the elongate conveyance belt 46 rotates in the direction indicated by arrow, the polarizer film 25 is driven to translate in order to realize continuous operation of peeling polarizer films.

Figure 5:
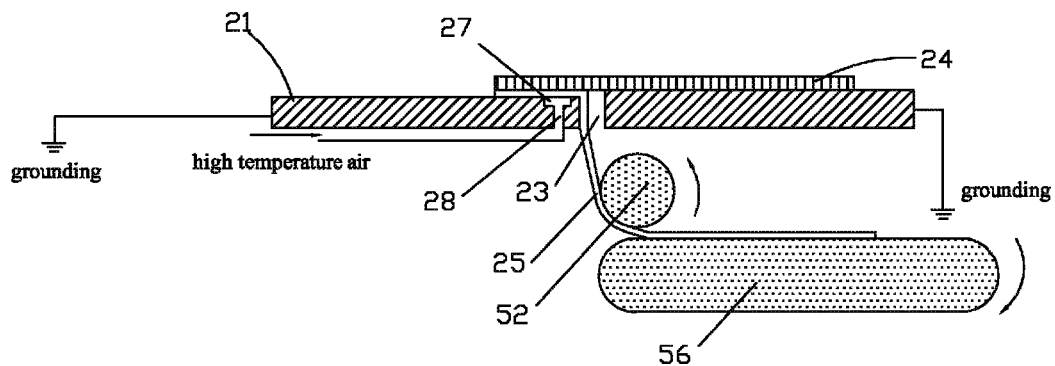
FIG. 5 is a longitudinal sectional view of a polarizer film peeling machine according to a further preferred embodiment of the present invention.

Referring to FIG. 5, a longitudinal sectional view of a polarizer film peeling machine according to a further preferred embodiment of the present invention is shown. In this preferred embodiment, identical references are used for similar or identical parts shown in FIG. 2 and the structure thereof may be referred to the description of FIG. 2. In the instant embodiment, a rotary roller 52 and a elongate conveyance belt 56 are arranged at opposite side with respect to those of FIG. 2, yet with rotation being made in the directions indicated by arrows of FIG. 5, the same result of causing the polarizer film 25 to translate can be achieved and a continuous operation peeling polarizer films can be realized.

Figure 6:
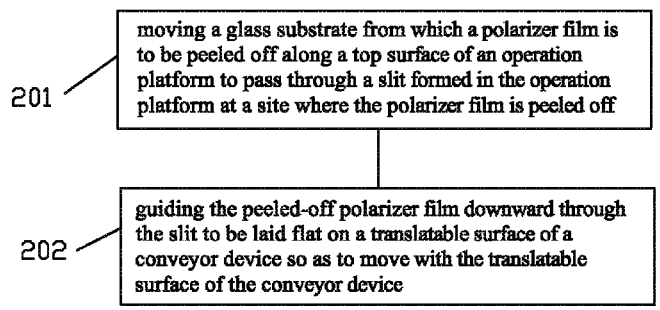
FIG. 6 is a flow chart illustrating a polarizer film peeling method according to a preferred embodiment carried out by the polarizer film peeling machine according to the present invention.

Referring to FIG. 6, a flow chart illustrating a polarizer film peeling method according to a preferred embodiment carried out by the polarizer film peeling machine according to the present invention is shown. Being performed in combination with the polarizer film peeling machine according to the present invention, the polarizer film peeling method according to the present invention generally comprises the following steps:

Step 201: moving a glass substrate from which a polarizer film is to be peeled off along a top surface of an operation platform to pass through a slit formed in the operation platform at a site where the polarizer film is peeled off; and Step 202: guiding the peeled-off polarizer film downward through the slit to be laid flat on a translatable surface of a conveyor device so as to move with the translatable surface of the conveyor device.

In the method, the conveyor device is an elongate conveyance belt or an elongate conveyance chain. The operation platform is made of an electrically conductive material and is grounded. The operation platform forms, in a location close to the slit, a recessed ventilation channel that is substantially parallel to the slit. The ventilation channel comprises air passages that are in communication with the ventilation channel, whereby high temperature air can be supplied through the air passages to heat the polarizer film during the operation of peeling off polarizer film.

In summary, the present invention provides a polarizer film peeling machine and a polarizer film peeling method thereof that allow operations of peeling off polarizer films to be carried out in a continuous process, eliminate the potential risks to panels and operators caused by accumulation of static electricity during the process of peeling off polarizer films, is capable of heating polarizer films to weaken peeling strength and reduce the chance of breaking substrates.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A polarizer film peeling machine, comprising an operation platform that is made of an electrically conductive material and is grounded and a conveyor device having a translatable surface, the operation platform comprising a slit at a site where a polarizer film is peeled off, the translatable surface of the conveyor device being located under the slit, whereby in peeling off a polarizer film, a glass substrate from which the polarizer film is to be removed is set to slide on a top surface of the operation platform to pass across the slit and the peeled-off polarizer film is guided through the slit to be laid flat on the translatable surface of the conveyor device and move with the translatable surface of the conveyor device.

2. The polarizer film peeling machine as claimed in claim 1, wherein the conveyor device comprises an elongate conveyance belt or an elongate conveyance chain.

3. The polarizer film peeling machine as claimed in claim 2, wherein a leading tip of the peeled-off polarizer film is coupled to an upper surface or a lower surface of the elongate conveyance belt or elongate conveyor chain.

4. The polarizer film peeling machine as claimed in claim 1, further comprising a rotary roller, which is arranged under the slit, whereby the peeled-off polarizer film that moves downward through the slit has its direction changed by the rotary roller so as to be laid flat on, and moved by, the translatable surface of the conveyor device.

5. The polarizer film peeling machine as claimed in claim 4, wherein a gap is formed between the rotary roller and the translatable surface of the conveyor device and the rotary roller is able to press the peeled-off polarizer film down toward the translatable surface of the conveyor device and allow the peeled-off polarizer film to pass through the gap.

6. The polarizer film peeling machine as claimed in claim 5, wherein the rotary roller is set to actively rotate or is passively rotated.

7. A polarizer film peeling machine, comprising an operation platform and a conveyor device having a translatable surface, the operation platform comprising a slit at a site where a polarizer film is peeled off, the translatable surface of the conveyor device being located under the slit, whereby in peeling off a polarizer film, a glass substrate from which the polarizer film is to be removed is set to slide on the a top surface of the operation platform to pass across the slit and the peeled-off polarizer film is guided through the slit to be laid flat on the translatable surface of the conveyor device and move with the translatable surface of the conveyor device;

wherein the operation platform comprises, in a location next to the slit, a recessed ventilation channel that is substantially parallel to the slit, the ventilation channel comprising air passages that are in communication with the ventilation channel.

8. The polarizer film peeling machine as claimed in claim 7, wherein the conveyor device comprises an elongate conveyance belt or an elongate conveyor chain.

9. The polarizer film peeling machine as claimed in claim 8, wherein a leading tip of the peeled-off polarizer film is coupled to an upper surface or a lower surface of the elongate conveyance belt or elongate conveyor chain.

10. The polarizer film peeling machine as claimed in claim 7, further comprising a rotary roller, which is arranged under the slit, whereby the peeled-off polarizer film that moves downward through the slit has its direction changed by the rotary roller so as to be laid flat on, and moved by, the translatable surface of the conveyor device.

11. The polarizer film peeling machine as claimed in claim 10, wherein a gap is formed between the rotary roller and the translatable surface of the conveyor device and the rotary roller is able to press the peeled-off polarizer film down toward the translatable surface of the conveyor device and allow the peeled-off polarizer film to pass through the gap.

12. The polarizer film peeling machine as claimed in claim 11, wherein the rotary roller is set to actively rotate or is passively rotated.

\* \* \* \* \*